United States Patent
Li et al.

(10) Patent No.: US 9,407,718 B2
(45) Date of Patent: Aug. 2, 2016

(54) METHOD AND SYSTEM FOR SERVICE DISCOVERY AND DEPLOYMENT IN AN IP MULTIMEDIA NETWORK

(75) Inventors: Gordon Yong Li, San Diego, CA (US); Xuemin Chen, Rancho Santa Fe, CA (US); Sam Anderson, Surrey (CA); Pierre Couilaud, Vancouver (CA)

(73) Assignee: BROADCOM CORPORATION, Irvine, CA (US)

( * ) Notice: Subject to any disclaimer, the term of this patent is extended or adjusted under 35 U.S.C. 154(b) by 442 days.

(21) Appl. No.: 12/829,212

(22) Filed: Jul. 1, 2010

(65) Prior Publication Data

US 2012/0005323 A1    Jan. 5, 2012

(51) Int. Cl.
*H04L 29/08* (2006.01)
*H04L 12/24* (2006.01)
*H04L 29/06* (2006.01)

(52) U.S. Cl.
CPC .......... *H04L 67/303* (2013.01); *H04L 65/1026* (2013.01); *H04L 29/08072* (2013.01); *H04L 41/0213* (2013.01); *H04L 65/80* (2013.01)

(58) Field of Classification Search
CPC ... H04L 67/303; H04L 65/1026; H04L 65/80; H04L 41/0213; H04L 29/08072
USPC .......................... 709/223, 227; 370/254, 401
See application file for complete search history.

(56) References Cited

U.S. PATENT DOCUMENTS

| | | | |
|---|---|---|---|
| 6,286,047 B1 * | 9/2001 | Ramanathan et al. | 709/224 |
| 6,959,332 B1 * | 10/2005 | Zavalkovsky et al. | 709/223 |
| 7,509,402 B2 * | 3/2009 | Moorer et al. | 709/220 |
| 7,587,464 B2 * | 9/2009 | Moorer et al. | 709/208 |
| 7,881,338 B2 * | 2/2011 | Damola et al. | 370/466 |
| 8,069,255 B2 * | 11/2011 | Grannan | 709/229 |
| 8,543,705 B2 * | 9/2013 | Cagenius | 709/227 |
| 2003/0112765 A1 * | 6/2003 | Gaspard ............. H04L 12/2697 370/252 |
| 2004/0133627 A1 * | 7/2004 | Kalyanaraman et al. | 709/201 |
| 2004/0249907 A1 * | 12/2004 | Brubacher et al. | 709/220 |

(Continued)

OTHER PUBLICATIONS

Office Action for related Korean Patent Application No. 10-2011-0065701 mailed Jul. 26, 2012.

(Continued)

*Primary Examiner* — Razu A Miah
(74) *Attorney, Agent, or Firm* — Foley & Lardner LLP; Christopher J. McKenna; Paul M. H. Pua (57) ABSTRACT

An IP multimedia residential gateway (IMRG) determines device capabilities and service priority profiles of client devices. The determined device capabilities and service priority profiles, comprising service classes and service class priorities, may be transmitted to the service managers for service deployment. The service managers may provide services to client devices based on corresponding device capabilities and service priority profiles. The IMRG may track device capabilities and service priority profiles for self-configuration. Available services supported by networks may be discovered during network discovery. The discovered services are announced to the client devices. The IMRG may communicate content of the announced services with the client devices based on corresponding device capabilities and service priority profiles. The service managers schedules services for the client devices based on corresponding device capabilities and service priority profiles, and may communicate content of the scheduled services to the client devices via the IMRG.

22 Claims, 5 Drawing Sheets

(56) References Cited

U.S. PATENT DOCUMENTS

| | | | |
|---|---|---|---|
| 2005/0021713 A1* | 1/2005 | Dugan et al. | 709/223 |
| 2005/0021761 A1* | 1/2005 | Thomas | 709/227 |
| 2006/0041915 A1* | 2/2006 | Dimitrova et al. | 725/81 |
| 2006/0221828 A1* | 10/2006 | Towle | 370/230 |
| 2006/0236083 A1* | 10/2006 | Fritsch et al. | 713/1 |
| 2006/0280127 A1* | 12/2006 | Mizuno et al. | 370/254 |
| 2007/0094366 A1* | 4/2007 | Ayoub | 709/223 |
| 2007/0100981 A1* | 5/2007 | Adamczyk et al. | 709/223 |
| 2007/0118560 A1* | 5/2007 | Bornhoevd et al. | 707/104.1 |
| 2007/0238472 A1* | 10/2007 | Wanless | 455/461 |
| 2008/0072292 A1* | 3/2008 | Narjala | 726/4 |
| 2008/0133729 A1* | 6/2008 | Fridman et al. | 709/223 |
| 2008/0162637 A1* | 7/2008 | Adamczyk et al. | 709/204 |
| 2008/0205419 A1* | 8/2008 | Shin et al. | 370/401 |
| 2008/0256259 A1* | 10/2008 | Bantz et al. | 709/238 |
| 2008/0291930 A1* | 11/2008 | Damola et al. | 370/401 |
| 2008/0305775 A1* | 12/2008 | Aaltonen | G06F 17/30905 455/412.1 |
| 2009/0016324 A1* | 1/2009 | Prouvost et al. | 370/352 |
| 2009/0019141 A1* | 1/2009 | Bush et al. | 709/223 |
| 2009/0083426 A1* | 3/2009 | Cagenius | 709/227 |
| 2009/0094317 A1* | 4/2009 | Venkitaraman | 709/203 |
| 2009/0132324 A1* | 5/2009 | Pelley et al. | 705/8 |
| 2009/0133098 A1* | 5/2009 | Pelley et al. | 726/1 |
| 2009/0225762 A1* | 9/2009 | Davidson et al. | 370/401 |
| 2009/0292664 A1* | 11/2009 | Dholakia et al. | 706/47 |
| 2010/0094981 A1* | 4/2010 | Cordray et al. | 709/222 |
| 2010/0142421 A1* | 6/2010 | Schlicht et al. | 370/310 |
| 2010/0185759 A1* | 7/2010 | Wu | 709/223 |
| 2010/0205309 A1* | 8/2010 | Skog et al. | 709/227 |
| 2010/0245606 A1* | 9/2010 | Karaoguz et al. | 348/211.99 |
| 2010/0262467 A1* | 10/2010 | Barnhill et al. | 705/10 |
| 2011/0019650 A1* | 1/2011 | van Niekerk | 370/338 |
| 2011/0075671 A1* | 3/2011 | Davidson et al. | 370/395.21 |
| 2011/0103571 A1* | 5/2011 | Astic et al. | 379/220.01 |

OTHER PUBLICATIONS

Office Action for Taiwan Patent Application No. 100123154 mailed Aug. 13, 2014 (including English summary).

Chinese Office Action for CN Application No. 2011101810197 mailed Dec. 18, 2014 (including English summary).

* cited by examiner

METHOD AND SYSTEM FOR SERVICE DISCOVERY AND DEPLOYMENT IN AN IP MULTIMEDIA NETWORK

CROSS-REFERENCE TO RELATED APPLICATIONS/INCORPORATION BY REFERENCE

This application makes reference to:
U.S. application Ser. No. 12/829,145 filed on Jul. 1, 2010,
U.S. application Ser. No. 12/829,179 filed on Jul. 1, 2010,
U.S. application Ser. No. 12/828,549 filed on Jul. 1, 2010,
U.S. application Ser. No. 12/828,652 filed on Jul. 1, 2010,
U.S. application Ser. No. 12/837,045 filed on Jul. 15, 2010,
U.S. application Ser. No. 12/837,052 filed on Jul. 15, 2010, and
U.S. application Ser. No. 12/837,089 filed on Jul. 15, 2010.

Each of the above stated applications is hereby incorporated herein by reference in its entirety.

FIELD OF THE INVENTION

Certain embodiments of the invention relate to communication systems. More specifically, certain embodiments of the invention relate to a method and system for service discovery and deployment in an IP multimedia network.

BACKGROUND OF THE INVENTION

Telecommunication technologies have evolved from analog to digital technologies, and continues to evolve from circuit switched to packet switched, from connection oriented packet switching to connectionless packet switching, and from narrow band application to broadband applications. The accompanied evolution in telecommunication technologies has significantly advanced operators' capability to offer broadband, IP-based multimedia services (IMS) ranging from entertainment and lifestyle applications such as mobile TV and mobile payment to professional services such as video conferencing and real-time data exchange.

IMS defines a standard framework for the deployment of next generation Web-based application services. IMS defines how these services connect and communicate with the underlying telecommunications network(s) and how they integrate with the network provider's back-end systems. IMS combines voice and data in one packet switched network such as, for example, the GPRS core network and the LTE core network, to offer network controlled multimedia services. Various Internet Protocols (IPs) such as the Session Initiation Protocol (SIP), the User Datagram Protocol (UDP), the Transmission Control Protocol (TCP) and Real-Time Transport Protocol (RTP) are widely utilized for delivery of various forms of multimedia applications over IP networks. SIP is an end-to-end application layer signaling protocol that is utilized to setup, modify, and teardown multimedia sessions such as audio/videoconferencing, interactive gaming, virtual reality, and call forwarding over IP networks. UDP and TCP are transport layer protocols that are used for data delivery over IP networks. TCP guarantees data delivery and integrity, however, UDP does not exclusively guarantee delivery of data. RTP is the Internet protocol which transports real-time data such as audio and video data. RTP does not exclusively guarantee real-time delivery of data, but it does provide mechanisms for the sending and receiving applications to support streaming and/or conversional data.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for service discovery and deployment in an IP multimedia network, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for service discovery and deployment in an IP multimedia network. In various embodiments of the invention, an IP multimedia residential gateway (IMRG) may be operable to discover or determine device capabilities and service priority profiles of one or more of a plurality of client devices. The IMRG may be operable to transmit or communicate the determined device capabilities and service priority profiles to one or more service managers via communication networks. The one or more service managers may provide services to the one or more of the plurality of client devices based on the corresponding determined device capabilities and service priority profiles. The IMRG may be operable to deploy services provided by the service managers over the one or more of the plurality of client devices. The determined service priority profiles may comprise service classes and service class priorities established by corresponding client devices. The determined service priority profiles may be announced via the IMRG to notify the plurality of client devices. The IMRG may dynamically configure itself based on the determined device capabilities and service priority profiles for service deployment. Services and other resources such as bandwidth available on communication networks may be discovered during network discovery. The IMRG may be operable to announce the discovered available services to notify the plurality of client devices. Content for the discovered available services may be communicated between specific client devices and the service managers via the IMRG. Services may be scheduled by the service managers for each of the plurality of client devices based on corresponding device capabilities and service priority profiles. The IMRG may be operable to communicate content of the scheduled services between the plurality of client devices and the service managers.

Figure 1:
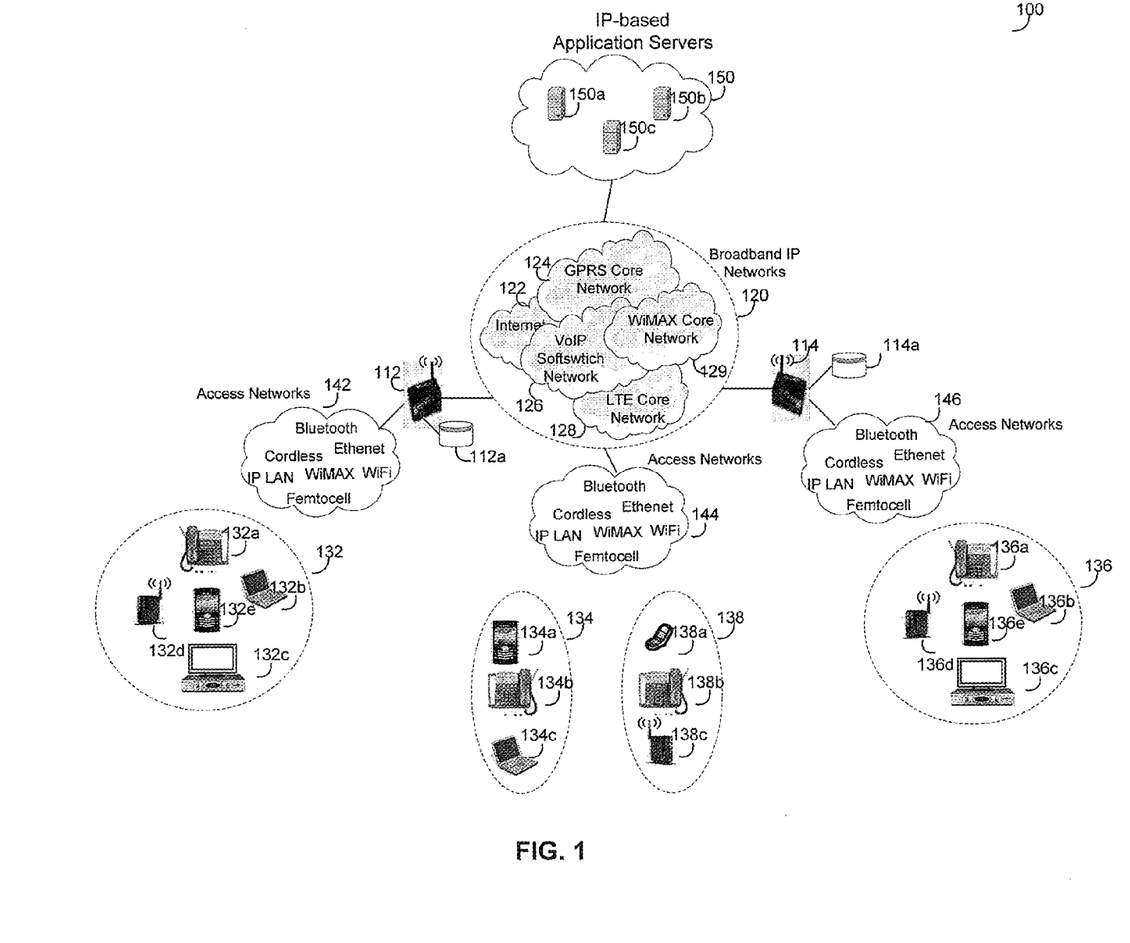
FIG. 1 is a diagram illustrating an exemplary communication system that is operable to utilize a generic IP multimedia residential gateway (IMRG) to support service discovery and deployment in an IP multimedia network, in accordance with an embodiment of the invention.

FIG. 1 is a diagram illustrating an exemplary communication system that is operable to utilize a generic IP multimedia residential gateway to support service discovery and deployment in an IP multimedia network, in accordance with an embodiment of the invention. Referring to FIG. 1, there is shown a communication system 100 comprising a plurality of IP multimedia residential gateways (IMRGs), of which IMRGs 112~114 are illustrated, broadband IP networks 120, a plurality of client devices 132a~132e, 134a~134c, 136a~136e, and 138a~138c, which are collectively referred to herein as client devices 132, 134, 136 and 138, respectively, a plurality of access networks 142-146, and IP-based application servers 150, of which service servers 150a~150c are displayed.

An IMRG such as the IMRG 112 may comprise suitable logic, circuitry, interfaces and/or code that are operable to connect the client devices 132a-132e to the broadband IP networks 120 for services of interest. A service may be described or represented by the service type and the service class. The type of a service refers to as the type of information to be transferred such as data, voice, text or video for the service. A service with a given service type may be classified into a plurality of exemplary scheduling service classes, namely, data services for Internet access and messaging, conversational services for carrier-grade voice and/or video calls and conferences, video services for TV, video and music streaming, gaming services for users to interact with one another via a central server, and corporate VPN services for access to enterprise intranet/email. Specific requirements may be placed on access networks and core networks for each service type and/or class to ensure desired end-to-end QoS. The service requirements on access networks and core networks may comprise, for example, system timing, CODEC, transmission rates, power-saving mechanisms, security profiles and content types. The system timing may be utilized to synchronize communications for delivery of service. The CODEC may comprise G.711, G.729, G.723, MPEG-4, VC-1, and VP6, for example. The power-saving mechanisms may comprise various power levels, which may be utilized within certain time intervals, for service transmissions. The security profiles may comprise service security descriptions such as, for example, security configurations and policies. The security configuration of a service may comprise protocols, credentials, and actions such as authentication actions. The content type of a service may specify what type of content that the service may comprise. The content type for a service may comprise, for example, Multipart Internet Mail Extensions (MIME) files, html pages, H.262, H.263, H.264/AVC video, G.711, BV16, BV32 voice, and DOCSIS Set-top Gateway (DSG) multimedia.

U.S. application Ser. No. 12/829,145, which is filed on Jul. 1, 2010, provides detailed descriptions of an IP multimedia residential gateway (IMRG) that may be operable to couple a plurality of communication devices to a plurality of broadband IP networks utilizing device-dependent interfaces for device access and technology-dependent broadband connections for network access, and is hereby incorporated herein by reference in its entirety.

The IMRG 112 may be operable to integrate local client devices as well as remote client devices to the broadband IP networks 120. Client devices such as the client devices 134a-134c that may remotely access the IMRG 112 via device-dependent interfaces are referred to as local client devices for the IMRG 112. A device-dependent interface may generally represent the PHY and MAC functionality of a particular access technology such as, for example, Ethernet, Wi-Fi, Bluetooth, cordless, and/or Femtocell. Client devices such as the client devices 132a-132e that may access the IMRG 112 via device-independent interfaces such as the broadband IP networks 120 are referred to as remote client devices for the IMRG 112. Client devices such as the client devices 136a-136e that may remotely access the IMRG 112 via other IMRGs such as the IMRG 114 are also referred to as remote client devices for the IMRG 112.

The IMRG 112 may be operable to perform automatic device and network discovery by utilizing proprietary methods and/or well-known networking protocols such as UPnP and DHCP, or a combination of both. For example, the IMRG 112 may be operable to multicast a discovery message. The IMRG 112 may discover or identify attached devices and/or networks from responses received to the discovery message. In this regard, the IMRG 112 may be operable to retrieve or determine, from the received responses, client device capabilities for the discovered devices, and/or network capabilities for the discovered networks.

The network capabilities may comprise interface types, processing protocols, service types, service classes and service requirements on network side. The interface types for the identified networks may comprise technology specific broadband IP connections such as DSL, Cable, FTTx, PLC and WiMAX. The protocols may comprise service layer protocols such as SSL and STP, technology-independent IP layer protocols such as SIP, TCP, and technology-dependent IP layer protocols such as Base Station System GPRS Protocol (BSSGP).

The client device capabilities may comprise interface types, processing protocols, service types, service classes, and/or service requirements. The interface types for the identified device may comprise access interface types such as Multimedia over Coax Alliance (MoCa), WiFi, Ethernet, Femtocell, and/or cordless. The processing protocols may comprise service layer protocols, IP layer protocols and link layer protocols, as specified, for example, in the Open Systems Interconnect (OSI) model. The service layer protocols may comprise secure protocols such as Secure Sockets Layer (SSL) and control protocols such as Spanning Tree Protocol (STP). The IP layer protocols may comprise IP signaling protocols such as SIP and H.323, and IP media transport protocols such as TCP, UDP, RTP and RTCP. The link layer protocols may comprise technology-specific PHY and MAC layer protocols such as, for example, MoCa, WiFi, Ethernet, Femtocell, and/or cordless.

In an exemplary embodiment of the invention, the IMRG 112 may be operable to determine device capabilities and service priority profiles during device discovery. The IMRG 112 may dynamically configure itself based on the device capabilities and service priority profiles discovered or determined in run-time. For example, the IMRG 112 may be operable to track or monitor associated dynamic client device environment by running, for example, UPnP, for an automatic device discovery. The IMRG 112 may retrieve or determine device capabilities and service priority profiles for discovered client devices. The determined device capabilities and service priority profiles may be utilized to dynamically configure the IMRG 112 for service deployment over the discovered client devices.

A service priority profile may comprise information such as, for example, QoS levels and service priorities that the user is entitled to request and receive. Service priorities are referred to as service class priorities that client devices may establish or may be subscribed to. Depending on device configuration, different service classes may be subscribed or established with different service priorities. For example, a client device such as the client device 132*a* may be configured to subscribe a service class such as video and music streaming with higher service priorities, and other service classes such as best-effort Internet access with lower service priorities. The service priority profiles may be announced by the IMRG 112 in order to notify associated client devices such as the client devices 132*a* through 132*e*.

In an exemplary embodiment of the invention, the IMRG 112 may be operable to track or monitor services available on networks by running, for example, UPnP, for an automatic network discovery. In this regard, the IMRG 112 may be operable to announce available services discovered during the network discovery to notify associated client devices such as the client devices 132*a* through 132*e*. The IMRG 112 may be operable to provide the discovered available services to associated client devices such as the client device 132*a* based on corresponding device capabilities and service priority profiles.

In an exemplary embodiment of the invention, the IMRG 112 may be operable to provide or communicate discovered device capabilities and service priority profiles of associated client devices to one or more service managers via the broadband IP networks 120. The one or more service managers may be operable to schedule services via the IP-based application servers 150*a*-150*c* for each client device based on corresponding client device capabilities and service priority profiles. The IMRG 112 may be operable to communicate content of the scheduled services between associated client devices such as the client device 132*a* and the service managers.

A client device such as the client device 132*a* may comprise suitable logic, circuitry, interfaces and/or code that are operable to receive services from different broadband IP networks through the IMRG 112. In various exemplary embodiments of the invention, the client device 132*a* may subscribe to or establish different service classes with different service priorities for service reception based on device capabilities and/or user's preferences. For example, the client device 132*a* may be configured to subscribe or establish a service class such as video and music streaming with higher service priorities, and other service classes such as best-effort Internet access with lower service priorities. In various exemplary embodiments of the invention, the client device 132*a* may be operable to utilize an access technology specific interface such as Bluetooth, LTE, WiFi and/or Ethernet to communicate with the IMRG 112 for services offered by different broadband IP networks or the service managers. The client device 132*a* may also be operable to communicate or exchange information with other client devices registered to the IMRG 112. In this regard, the client device 132*a* may share information such as associated service priority profiles with local client devices such as client devices 132*b*-132*e* as well as remote client devices such as the client devices 134*a*-134*c*. The client device 132*a* may be dynamically configured to receive services from the broadband IP networks 120 as well as networked client devices such as the client device 132*e*.

An access network such as the access network 142 may comprise suitable logic, circuitry, communication devices, interfaces and/or code that are operable to communicate services utilizing various access technologies such as, for example, IP LAN, Bluetooth, WiFi, Femtocell, LTE and WiMAX.

An IP-based application server such as the IP-based application server 150*a* may comprise suitable logic, circuitry, interfaces and/or code that are operable to provide IP-based services to various broadband IP networks 120. In this regard, the IP-based application server 150*a* may be configured to deliver carrier-grade as well as no-carrier-grade broadband access services to users through the broadband IP networks 120. The IP-based application server 150*a* may be operable to schedule delivery of carrier-grade services to ensure service integrity. No-carrier-grade services may be delivered when needed without reliability and stability ensured. In an exemplary embodiment of the invention, the IP-based application server 150*a* may be operable to receive information such as device capabilities and service priority profiles from the IMRG 112-114 to facilitate service scheduling for client devices associated with the IMRG 112-114. In this regard, the IP-based application server 150*a* may be configured to schedule services for each client device based on corresponding device capabilities and service priority profiles. The IP-based application server 150*a* may be operable to communicate content of the scheduled services with corresponding client devices such as the client device 132*a* via the IMRG 112, for example.

Although IP multimedia residential gateways (IMRGs) are illustrated in FIG. 1 for service discovery and deployment in an IP multimedia network, the invention may not be so limited. Accordingly, other IP multimedia gateways for service discovery and deployment in an IP multimedia network may be supported without departing from the spirit and scope of various embodiments of the invention. The IP multimedia gateways may be, for example, IP multimedia residential gateway (IMRGs) which may be located at a residential location. The IP multimedia gateways may be located in non-residential locations comprising, for example, a commercial building, an office, an office complex, an apartment building and/or a factory.

In an exemplary operation, an IMRG such as the IMRG 112 may be operable to communicatively couple or connect a plurality of client devices to the broadband IP networks 120. The IMRG 112 may be operable to track or monitor device capabilities and service priority profiles of client devices to configure itself for service deployment. The IMRG 112 may be operable to identify or discover services and/or other resources such as bandwidth available on networks during network discovery. The IMRG 112 may announce the discovered available services to notify associated client devices such as the client devices 132*a*-132*e*. In instances where a service request is received from a client device such as the client device 132*a* for the announced services, the IMRG 112 may be operable to communicate content of the discovered available services between the client device 132*a* and the service managers. The IMRG 112 may be operable to provide or communicate device capabilities and service priority profiles of associated client devices to the service managers for service scheduling. The service managers may be operable to schedule services for each client device based on corresponding device capabilities and service priority profiles. The scheduled services may be deployed via the IMRG 112 over corresponding client devices.

Figure 2:
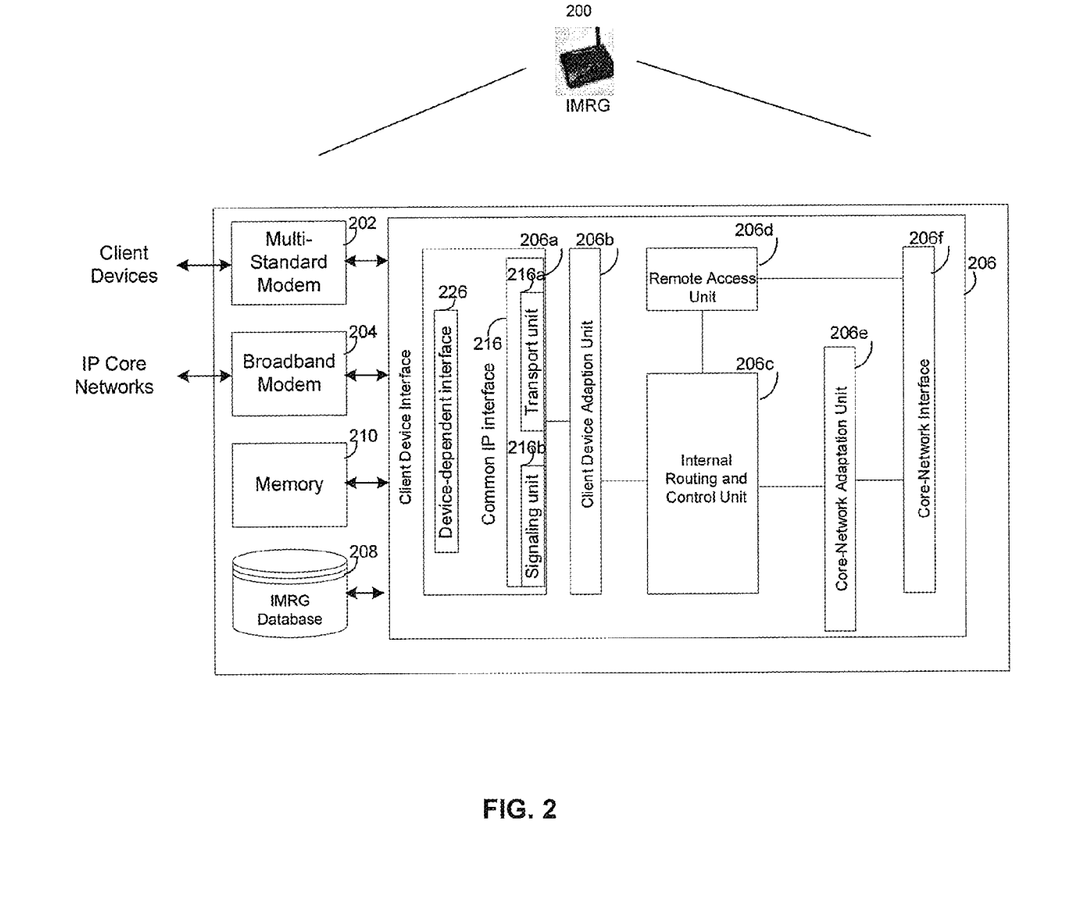
FIG. 2 is a diagram illustrating an exemplary generic IP multimedia residential gateway (IMRG) that is operable to seamlessly perform service discovery and deployment in an IP multimedia network, in accordance with an embodiment of the invention.

FIG. 2 is a diagram illustrating an exemplary generic IP multimedia residential gateway (IMRG) that is operable to seamlessly perform service discovery and deployment in an IP multimedia network, in accordance with an embodiment of the invention. Referring to FIG. 2, there is shown an IP multimedia residential gateway (IMRG) 200 comprising a multi-standard modem 202, a broadband modem 204, an IMRG processor 206, an IMRG database 208 and a memory 210.

The multi-standard modem 202 may comprise suitable logic, circuitry, interfaces and/or code that are operable to communicate with a plurality of client devices such as the client devices 132a-132e and 134a-134c utilizing a device-dependent interface such as, for example, Ethernet, Wi-Fi, Bluetooth, cordless, and/or Femtocell.

The broadband modem 204 may comprise suitable logic, circuitry, interfaces and/or code that are operable to transmit voice and/or data in adherence with one or more internet protocol (IP) broadband standard. The broadband modem 204 may be operable to transmit and/or receive voice and/or data to and/or from the broadband IP networks 120 over broadband connections such as, for example, T1/E1 line, DSL, Cable, FTTx, PLC and WiMAX. The broadband modem 204 may dynamically configure one or more network interfaces utilized within the broadband modem 204 towards to the broadband IP networks 120. For example, in instances where the broadband modem 204 is signaled to exchange information with the VoIP softswitch network 126, the broadband modem 204 may be configured to utilize FTTx as an access solution to the VoIP softswitch network 126.

The IMRG processor 206 may comprise suitable logic, circuitry, interfaces and/or code that are operable to perform a variety of signal processing tasks to maintain or manage communication between associated client devices and the broadband IP networks 120, and/or among associated client devices. The IMRG processor 206 may comprise a client device interface 206a, a client device adaptation unit 206b, an internal routing and control unit 206c, a remote access unit 206d, a core-network adaptation unit 206e and a core-network interface 206f.

The client device interface 206a may comprise suitable logic, circuitry, interfaces and/or code that are operable to perform protocol conversion for client device access. The client device interface 206a may comprise a device-dependent interface 226 and a common IP interface 216. The device-dependent interface 226 may comprise suitable logic, circuitry, interfaces and/or code that are operable to access local client devices over device-dependent connections such as WiFi and LTE connections. The device-dependent interface 226 may be operable to support link layer protocols for specific PHY and MAC functionality of a particular access technology. For example, in instanced where the client device interface 206a is signaled to access a WiFi enabled client device such as the client device 132c, the client device interface 206a may exchange information with the client device 132c utilizing WiFi air interface protocols for corresponding link layer communication. The device-dependent interface 226 may support different IP transport and/or signaling components utilized by client devices. The common IP interface 216 may comprise suitable logic, circuitry, interfaces and/or code that are operable to provide a common IP support to communicate content between various client devices and the broadband IP networks 120. The common IP interface 216 may comprise a transport unit 216a and a signaling unit 216b. The transport unit 216a may comprise suitable logic, circuitry, interfaces and/or code that are operable to provide a single IP transport component such as RTP to support data communication over IP. The signaling unit 216b may comprise suitable logic, circuitry, interfaces and/or code that are operable to provide a single IP signaling component such as SIP to support signaling communication over IP. The client device interface 206a may perform protocol mapping or translation between different IP transport and/or signaling components utilized by client devices and the common IP-based interface 216 running on the IMRG processor 206.

The client device adaptation unit 206b may comprise suitable logic, circuitry, interfaces and/or code that are operable to adapt a wide range of client devices. In this regard, the client device adaptation unit 206b may be operable to perform, for example, media or content transcoding, rate conversion, system timing adjustment and/or power control based on corresponding client device capabilities to improve user experiences.

The internal routing and control unit 206c may comprise suitable logic, circuitry, interfaces and/or code that are operable to route and distribute media, signaling and event packets among client devices attached to the IMRG 112, for example. The internal routing and control unit 206c may collect or track client device capabilities and service priority profiles for associated client devices and network capabilities to build the IMRG database 208.

In various exemplary embodiments of the invention, the internal routing and control unit 206c may be dynamically configured based on device capabilities and service priority profiles of associated client devices. In this regard, the internal routing and control unit 206c may be operable to communicate content of available services discovered during network discovery to associated client devices based on corresponding device capabilities and service priority profiles. Information such as available services on networks and service priority profiles of each client device may be announced to notify associated local and remote client devices to facilitate service deployment. The internal routing and control unit 206c may acquire services for specific client devices such as the client devices 132a-132e from one or more the service managers such as, for example, the IP-based application servers 150, based on corresponding device capabilities and service priority profiles. In this regard, the internal routing and control unit 206c may communicate or provide the device capabilities and service priority profiles of the client devices 132a-132e to the IP-based application servers 150 for service scheduling. Services may be scheduled by the IP-based application servers 150 for the client devices 132a-132e based on corresponding device capabilities and service priority profiles. The internal routing and control unit 206c may coordinate with the broadband modem 204 and the multi-standard modem 202 to communicate content of the scheduled services between the IP-based application servers 150 and corresponding client devices.

The remote access unit 206d may comprise suitable logic, circuitry, interfaces and/or code that are operable to provide necessary functionality for the support of remote access by client devices that are roaming outside of a local coverage of the IMRG 112. In this regard, the remote access unit 206d may be operable to exchange information with remote client devices over broadband connections to the broadband IP networks 120.

The core-network adaptation unit 206e may comprise suitable logic, circuitry, interfaces and/or code that are operable to provide adaptation to different broadband IP networks for various client devices. In this regard, the core-network adaptation unit 206e may perform, for example, protocol translation and mapping between a common IP protocol utilized by the IMRG 200 and protocols used by different broadband IP networks.

The core-network interface 206f may comprise suitable logic, circuitry, interfaces and/or code that are operable to provide various broadband connections such as, for example, DSL, Cable, FTTx, PLC and WiMAX for access to the broadband IP networks 120.

The IMRG database 208 may comprise suitable logic, circuitry, interfaces and/or code that are operable to store and manage client device information and network information. In this regard, the IMRG database 208 may comprise registration status information for associated client devices. The registration status for a client device pertaining to the IMRG 200 may be a local client device or a remote client device. The IMRG database 208 may be operable to keep tracking or collecting client device capabilities, service priority profiles and network capabilities. The collected capability information may be utilized to dynamically configure the IMRG 200 as well as client devices pertaining to the IMRG 200. The IMRG database 208 may comprise RAM, ROM, low latency nonvolatile memory such as flash memory and/or other suitable electronic data storage capable of storing data and instructions The memory 210 may comprise suitable logic, circuitry, interfaces and/or code that are operable to store and manage data and/or other information utilized by the IMRG processor 206. For example, the memory 210 may be utilized to store processed data or content generated by the IMRG processor 206. The memory 210 may be enabled to store executable instructions to process, for example, protocol mapping and/or media transcoding. The memory 210 may comprise RAM, ROM, low latency nonvolatile memory such as flash memory and/or other suitable electronic data storage capable of storing data and instructions.

In an exemplary operation, an IMRG such as the IMRG 200 may provide connections for various client devices to the broadband IP networks 120. The IMRG 112 may be operable to search for attached client devices and broadband IP networks via an automatic device and network discovery. The IMRG 200 may be operable to track or monitor device capabilities and service priority profiles of discovered client devices. The internal routing and control unit 206c may be dynamically configured based on the device capabilities and service priority profiles of the discovered client devices. Available services discovered during network discovery may be deployed over associated client devices such as the client devices 132a-132e via the multi-standard modem 202. The internal routing and control unit 206c may be operable to communicate content of available services between the client devices 132a-132e and the service managers based on corresponding device capabilities and service priority profiles. The internal routing and control unit 206c may be operable to communicate information such as device capabilities and service priority profiles of associated client devices such as the client devices 132a-132e to the service managers to schedule services for the client devices 132a-132e. In this regard, the IP-based application servers 150 may be operable to schedule services for the client devices 132a-132e based on corresponding device capabilities and service priority profiles. The internal routing and control unit 206c may be operable to communicate content of the scheduled services to corresponding client devices such as the client devices 132a-132e over the multi-standard modem 202.

Figure 3:
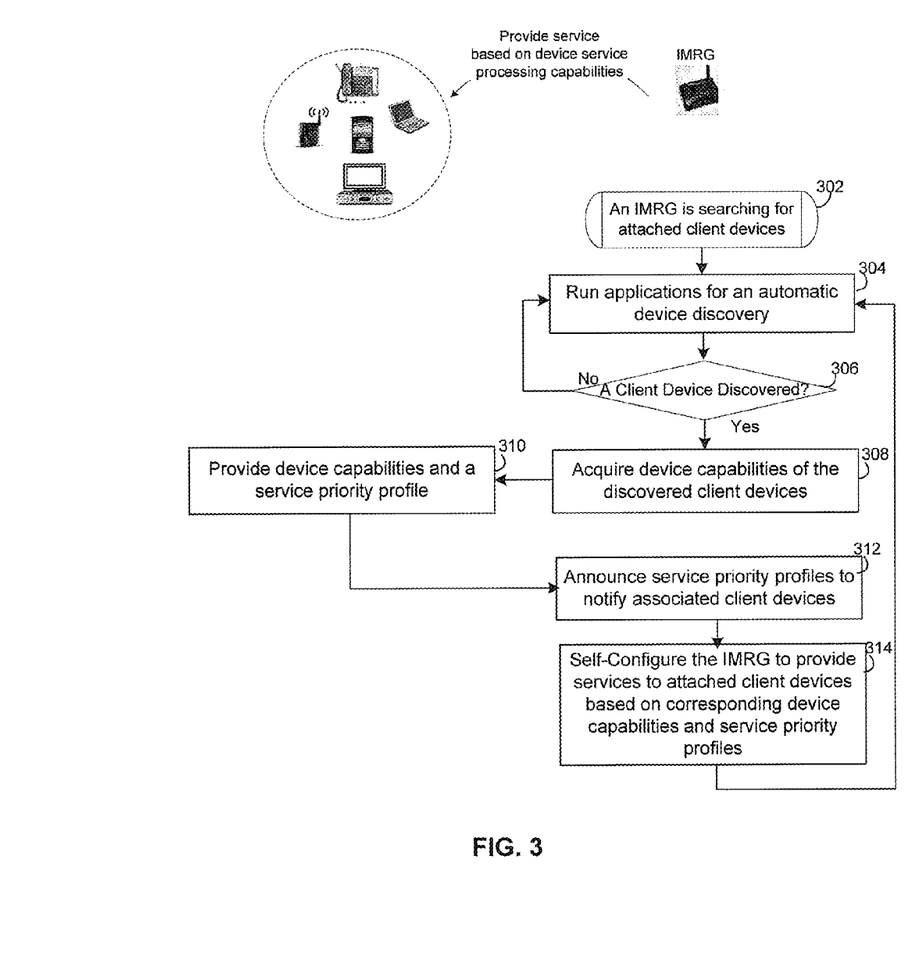
FIG. 3 is a block diagram illustrating exemplary steps that may be performed to configure a generic IP multimedia residential gateway (IMRG) based on discovered client device capabilities and service priorities, in accordance with an embodiment of the invention.

FIG. 3 is a block diagram illustrating exemplary steps that may be performed to configure a generic IP multimedia residential gateway (IMRG) based on discovered client device capabilities and service priorities, in accordance with an embodiment of the invention. Referring to FIG. 3, the exemplary steps may start with step 302. In step 302, an IMRG such as the IMRG 112 may be configured to search for attached client devices. In step 304, the IMRG 112 may be operable to run applications such as UPnP, in background or transparently, for an automatic device discovery. In step 306, the IMRG 112 may wait for responses to the automatic device discovery so as to discover or identify client devices attached. In instances where a client device such as the client device 132a is discovered, then in step 308, the IMRG 112 may be operable to retrieve or determine client device capabilities for the discovered devices such as the client devices 132a-132e. In step 310, the client devices 132a-132e may be operable to communicate or provide device capabilities and service priority profiles to the IMRG 112. In step 312, the IMRG 112 may announce service priority profiles to notify associated client devices such as the client devices 132a-132e and 134a-134c. In step 314, the IMRG 112 may dynamically configure itself based on device capabilities and service priority profiles determined in run-time from associated client devices such as the client devices 132a-132e. The exemplary steps may return to step 304.

In step 306, in instances where no client device is discovered, then the exemplary steps may return to step 304.

Figure 4:
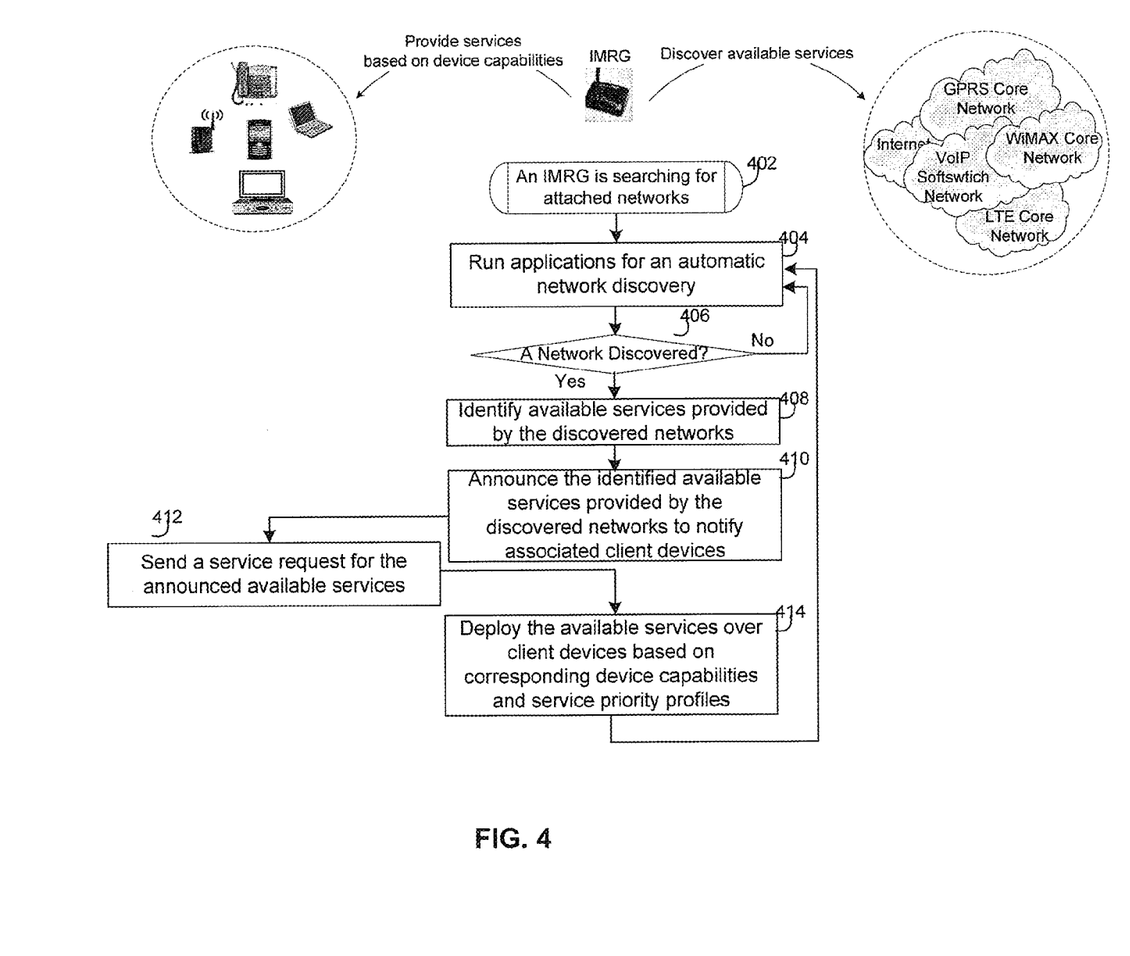
FIG. 4 is a block diagram illustrating exemplary steps that may be performed by a generic IP multimedia residential gateway (IMRG) to deploy available services discovered during network discovery over associated client devices based on corresponding device capabilities and service priorities, in accordance with an embodiment of the invention.

FIG. 4 is a block diagram illustrating exemplary steps that may be performed by a generic IP multimedia residential gateway (IMRG) to deploy available services discovered during network discovery over associated client devices based on corresponding device capabilities and service priorities, in accordance with an embodiment of the invention. Referring to FIG. 4, the exemplary steps start with step 402. In step 402, an IMRG such as the IMRG 112 may be operable to search for attached networks. In step 404, the IMRG 112 may be operable to run applications such as UPnP, in background or transparently, for an automatic network discovery. In step 406, the IMRG 112 may wait for responses to the automatic network discovery to discover attached networks. In instances where a network such as the WiMAX core network 129 is discovered, then in step 408, the IMRG 112 may be operable to retrieve or identify available services provided by the discovered networks. In step 410, the IMRG 112 may announce the available services to notify associated client devices such as the client devices 132a-132e. In step 412, the associated client devices such as the client device 132a may be operable to send or communicate a service request for the announced available services to the IMRG 112. In step 414, the IMRG 112 may be operable to deploy the announced available services over the client device 132a based on corresponding device capabilities and service priority profiles. The exemplary steps may return to step 404.

In step 406, in instances where no network is discovered, then the exemplary steps may return to step 404.

Figure 5:
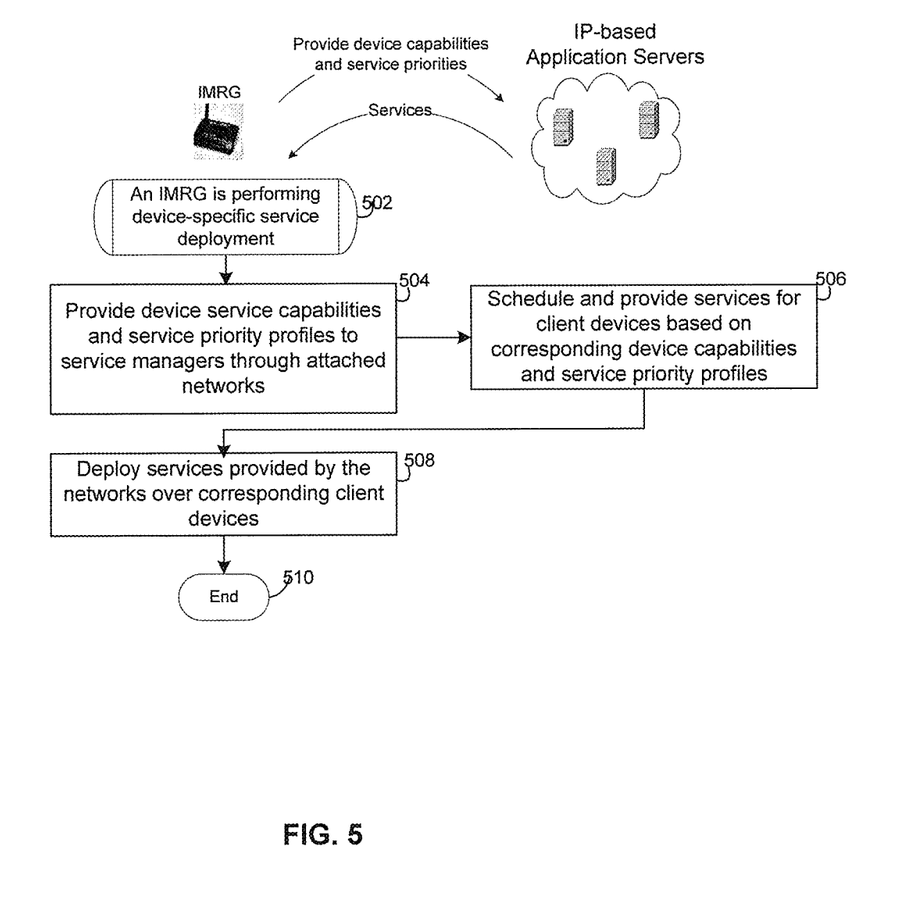
FIG. 5 is a block diagram illustrating exemplary steps that may be performed by a generic IP multimedia residential gateway (IMRG) to provide discovered device capabilities and service priorities to the service managers for service deployment, in accordance with an embodiment of the invention.

FIG. 5 is a block diagram illustrating exemplary steps that may be performed by a generic IP multimedia residential gateway (IMRG) to provide discovered device capabilities and service priorities to the service managers for service deployment, in accordance with an embodiment of the invention. Referring to FIG. 5, the exemplary steps start with step 502. In step 502, an IMRG such as the IMRG 200 may be operable to perform device-specific service deployment over attached client devices. In step 504, the IMRG 200 may be operable to provide discovered device capabilities and service priority profiles of attached client devices such as the client devices 132a-132e to the service managers such as the IP-based application servers 150. In step 506, the IP-based application servers 150 may be configured to schedule services for client devices based on corresponding device capabilities and service priority profiles. In step 508, the IMRG 112 may be operable to deploy the scheduled services provided by the IP-based application servers 150 over corresponding client devices. The exemplary steps may end in step 510.

In various exemplary aspects of the method and system for service discovery and deployment in an IP multimedia network, an IP multimedia residential gateway (IMRG) such as the IMRG 112 may be operable to determine device capabilities and service priority profiles of one or more of a plurality of communication devices such as the client devices 132a-132e. The IMRG 112 may be operable to transmit or communicate the determined device capabilities and service priority profiles to one or more service managers such as the IP-based application servers 150 via the broadband IP networks 120 for service scheduling. The IP-based application servers 150 may provide services to the client devices 132a-132e based on the corresponding device capabilities and service priority profiles. The provided services may be deployed over the client devices 132a-132e via the IMRG 112. The determined service priority profiles may comprise service classes and service class priorities established by corresponding client devices such as the client devices 132a-132e. The IMRG 112 may announce the determined service priority profiles to notify the client devices 132a-132e.

The IMRG 112 may dynamically configure itself based on the determined device capabilities and service priority profiles for service deployment. During network discovery, the IMRG 112 may be operable to discover or identify available services provided by the IP-based application servers 150 on the broadband IP networks 120. The discovered available services may be announced to notify the client devices 132a-132e. Service requests for the announced services may be received from client devices such as the client device 132a. The IMRG 112 may communicate content of the available services between the client device 132 and the IP-based application servers 150 based on the determined device capabilities and service priority profiles for the client device 132a. The service managers such as the IP-based application servers 150 may be operable to schedule services for each of the client devices 132a-132e based on corresponding device capabilities and service priority profiles provided by the IMRG 112. The IMRG 112 may be configured to communicate content of the scheduled services between the client devices 132a-132e and the IP-based application servers 150a through 150c, for example.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for service discovery and deployment in an IP multimedia network.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
determining, by an IP multimedia residential gateway (IMRG) intermediary between a communication device and a service manager, a service priority profile of said communication device, said service priority profile comprising classes of services and priorities of said classes established by said communication device;
performing, by the IMRG, a network discovery for determining a network capability of a network attached to the IMRG;
communicating, by the IMRG, said determined service priority profile and said determined network capability to the service manager via the network attached to the IMRG; and
deploying, via the IMRG, a service directed to the communication device, wherein said deployed service is provided by said service manager based on said communicated service priority profile and said communicated network capability.

2. The method according to claim 1, wherein the IMRG is configured to perform a device discovery for determining a device capability of the communication device in communication with the IMRG, the communication device configured to communicate with the IMRG using an access network.

3. The method according to claim 1, wherein each of a plurality of communication devices is associated with the IMRG, wherein the IMRG is further configured to announce said determined service priority profile to said plurality of communication devices.

4. The method according to claim 1, further comprising configuring said IMRG based on said determined network capability and said determined service priority profile for said facilitation of deployment.

5. The method according to claim 1, further comprising discovering an available service provided by said service manager.

6. The method according to claim 5, comprising announcing said discovered available service to said communication device.

7. The method according to claim 6, comprising receiving a request for said announced service from said communication device.

8. The method according to claim 7, comprising communicating, subsequent to said reception, content of said discovered available service between said communication device and said service manager based on said determined and said determined service priority profile.

9. The method according to claim 2, wherein said service manager is configured to schedule said service for said communication device based on said communicated device capability.

10. The method according to claim 9, comprising communicating content of said scheduled service between said communication device and said service manager.

11. The method according to claim 2, wherein said device capability is selected from a group consisting of a Multimedia over Coax Alliance (MaCa) interface type, a WiFi interface type, an Ethernet interface type, a Femtocell interface type, an IP layer protocols, a link layer protocols, and a service layer protocol.

12. A system for communication, the system comprising:
a processor of an IP multimedia residential gateway (IMRG) intermediary between a communication device and a service manager, the IMRG configured to determine a device capability and a service priority profile of said communication device in communication with the IMRG, said service priority profile comprising classes of services and priorities of said classes established by said communication device;
a transceiver of the IMRG configured to communicate said determined device capability and said determined service priority profile via a network to the service manager; and
the processor of the IMRG configured to facilitate deployment of a service via the IMRG directed to said communication device, wherein said deployed service is provided by said service manager based on said communicated device capability and said communicated service priority profile.

13. The system according to claim 12, wherein said services comprise services provided by said service manager available to said communication device.

14. The system according to claim 12, wherein each of a plurality of communication devices is associated with said IMRG, wherein said IMRG is further configured to announce said determined service priority profile to said plurality of communication devices.

15. The system according to claim 12, wherein said IMRG is further configured to configure itself based on said determined device capability and said determined service priority profile for said facilitation of deployment.

16. The system according to claim 12, wherein said IMRG is further configured to discover an available service provided by said service manager.

17. The system according to claim 16, wherein each of a plurality of communication devices is associated with said IMRG, wherein said IMRG is further configured to announce said discovered available service to said plurality of communication devices.

18. The system according to claim 17, wherein said IMRG is further configured to receive requests for said announced service from said communication device.

19. The system according to claim 18, wherein said IMRG is further configured to communicate, subsequent to said reception, content of said discovered available service between said communication device and said service manager based on said determined device capability and said determined service priority profile.

20. The system according to claim 12, wherein said service manager is configured to schedule said service for said communication device based on said communicated device capability and said communicated service priority profile.

21. The system according to claim 20, wherein said IMRG is further configured to communicate content of said scheduled service between said communication device and said service manager.

22. The system according to claim 12, wherein said device capability is selected from a group consisting of a Multimedia over Coax Alliance (MaCa) interface type, a WiFi interface type, an Ethernet interface type, a Femtocell interface type, an IP layer protocols, a link layer protocols, and a service layer protocol.

* * * * *